United States Patent Office 3,297,944
Patented Jan. 10, 1967

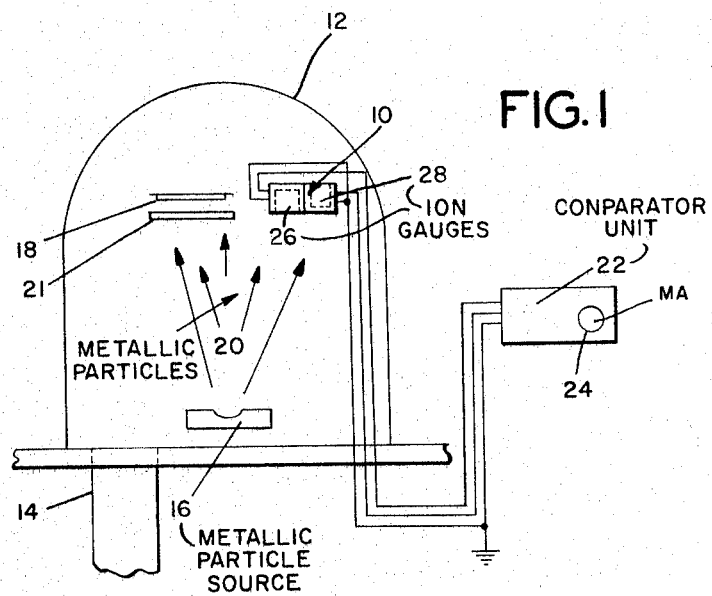
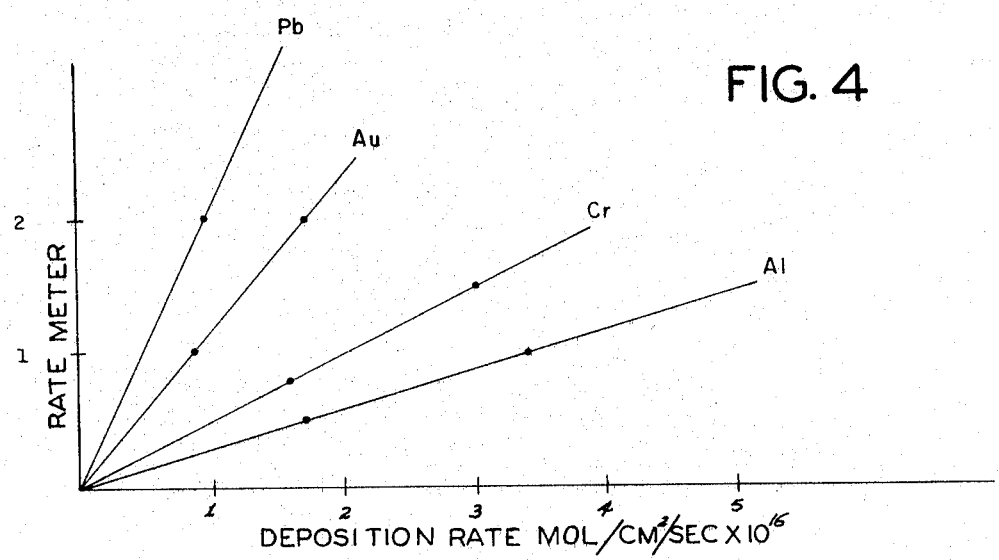

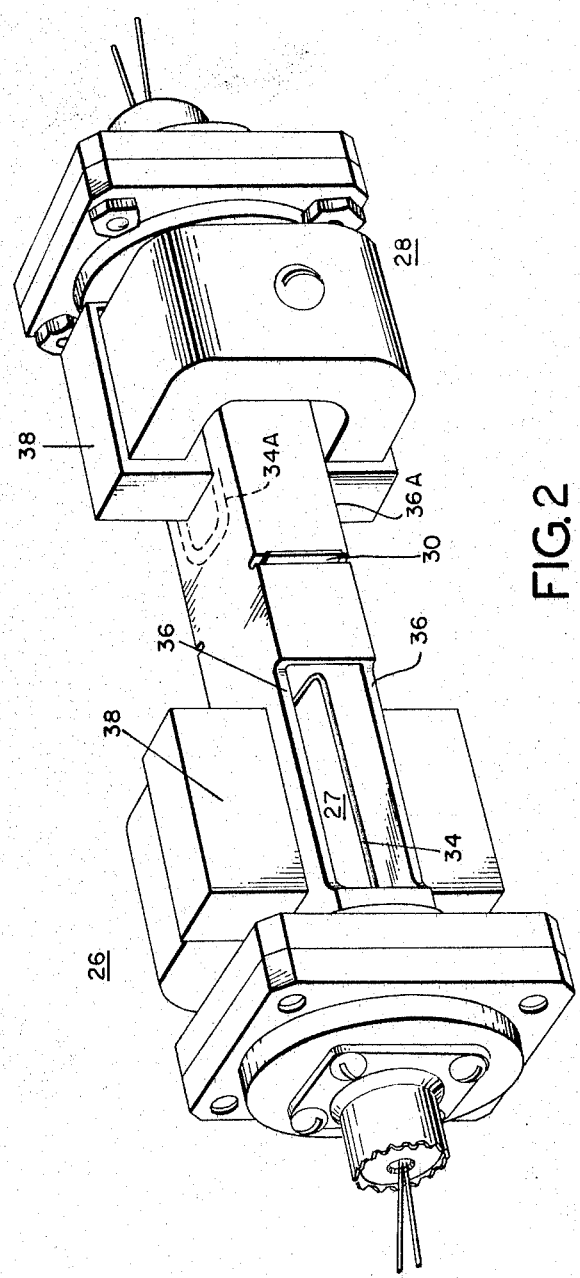

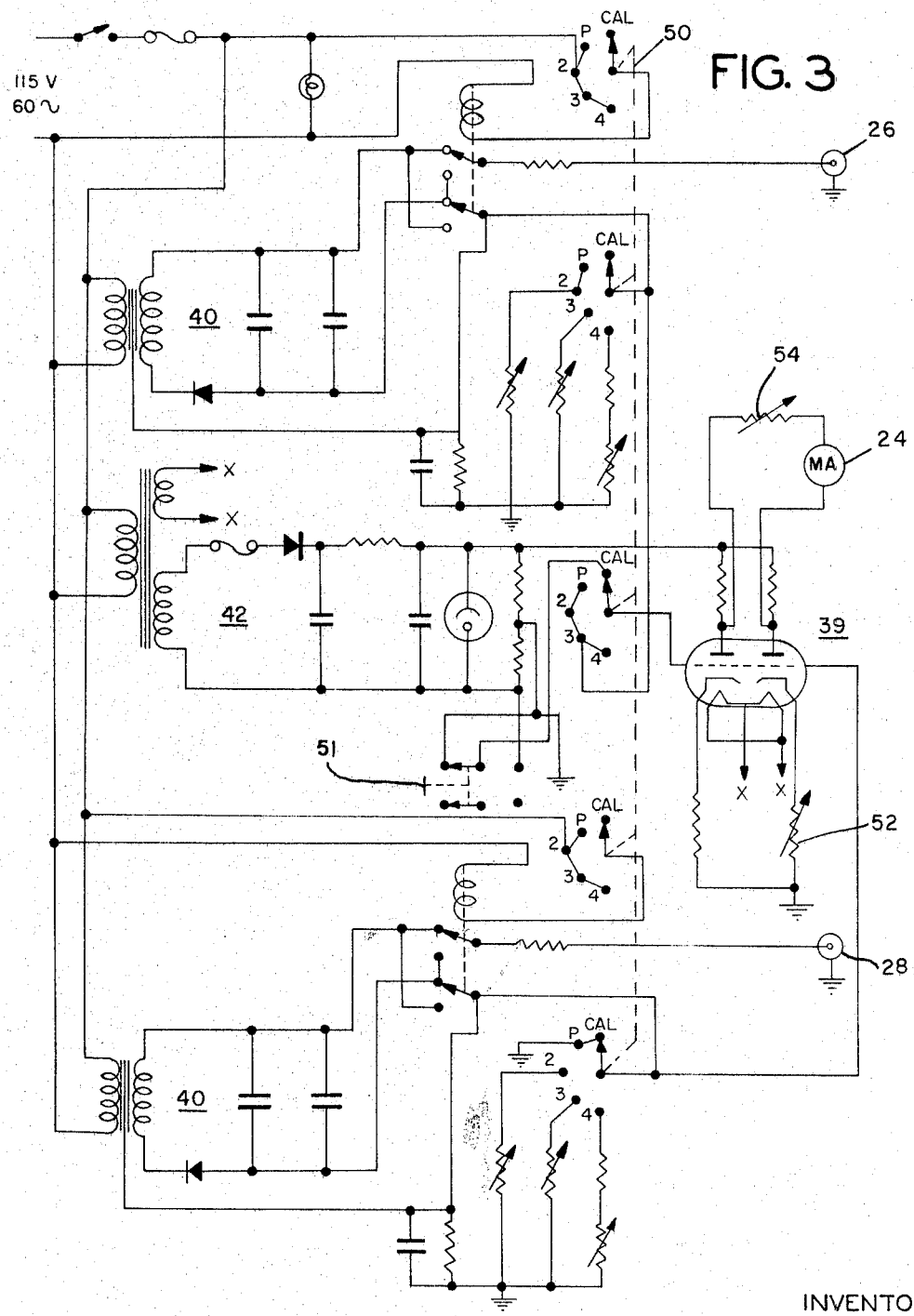

3,297,944
EVAPORATION RATE MONITOR USING TWO INTEGRATED ION GAUGES
Paul Nektaredes, Manhattan Beach, and Robert Y. Scapple, Los Angeles, Calif., assignors to Hughes Aircraft Company, Culver City, Calif., a corporation of Delaware
Filed Jan. 2, 1963, Ser. No. 249,044
2 Claims. (Cl. 324—33)

The present invention relates to an improved system for monitoring the rate of vacuum deposition of metallic particles and more particularly to a system for monitoring the rate of evaporation of metallic particles to control the quality of microelectronic thin films.

In the construction of microelectronic thin film devices it is extremely important to evaporate onto a substrate a known quantity of metal at a known evaporation rate. The rate of evaporation is particularly important in controlling the quality of metallic and resistor films because it affects the film structure and the extent of residual gas interaction. One way to accomplish this control is to adjust the evaporation rate or flux of metal particles prior to the opening of a shutter or a screen covering the substrate. When the predetermined flux is obtained the shutter or screen is opened for a given time allowing the metal to deposit onto the substrate giving the required quantity or thickness.

In addition, in the construction of microelectronic and other thin film devices the quality of thin films formed must be reproducible. While the variables controlling the evaporation process are time, pressure, source temperature, quantity of evaporant, source to substrate distance, and the evaporation rate, the quality of the film is dependent greatly and frequently primarily on the evaporation rate.

Therefore, it is an object of this invention to provide an improved device for monitoring and controlling the evaporation rate of metallic particles in a vacuum evaporation process.

It is another object of this invention to provide an improved sensing device for the monitoring of the evaporation rate of metallic particles which is rugged and useful within the range of from $5 \times 10^{-3}$ Torr to $5 \times 10^{-6}$ Torr.

It is a further object of this invention to provide an improved sensing device for the monitoring of the evaporation rate of metallic particles which can be used for most metallic particle evaporation processes without changing performance characteristics due to prior "contamination" by foreign metallic particles.

Briefly, the monitoring system of the present invention includes a sensing device which comprises two cold cathode ionization gauges arranged to be positioned with an evaporation chamber so that one of the gauges is in the path of the metallic particles and a power supply and comparator circuit. Since one of the gauges is exposed to the evaporant metallic particles it measures a current in excess of that due to the residual gas alone, while the other gauge measures a current dependent on only the residual gas. When both signals, that is the one produced by the exposed gauge and the one produced by the unexposed gauge are fed into the comparator circuit, the resultant output signal is representative of a rate which may be expressed on a milliammeter in terms of grams or mols per square centimeter per second.

Other advantages of the invention will hereinafter become more fully apparent from the following description of the drawings which illustrate a preferred embodiment of the present invention, and in which:

FIGURE 1 is a block diagram depicting one embodiment of the improved monitoring system of the present invention illustrating the positioning of the sensing device in the vacuum evaporation chamber;

FIG. 2 is a perspective view of one embodiment of the sensing device of the present invention illustrating the structure of the cold cathode ionization gauges;

FIG. 3 is a schematic drawing of the electrical circuit of the present invention illustrating the three power supplies and the comparator circuit; and FIG. 4 is a graph illustrating the relationship of the deposition rate of four common metals as monitored by the improved system of the present invention.

Referring to FIG. 1, the present invention includes a sensing device 10 positioned within a vacuum chamber 12 including a port 14 to which may be connected (not shown) a conventional vacuum pump. The chamber 12 is typically a closed bell jar and contains a metallic particle source 16 such as a heated crucible and a substrate or object 18 onto which the metallic particles 20 shown representatively as a plurality of arrows are deposited. The sensing device 10 is shown positioned within the path of a portion of the metallic particles 20 and includes a plurality of electrical conductors coupling it with a power supply and comparator unit 22 including a visual indicating meter 24 conventionally calibrated such a milliammeter. The substrate 18 is typically positioned behind a shutter or screen 21 which is removed either automatically or manually by the operation of a conventional mechanism (not shown) to permit deposition of the particles 20 on the substrate 18 when a predetermined deposition rate is indicated on the meter 24.

One embodiment of the sensing device 10 as illustrated in FIG. 2 includes a first ion gauge 26 having an opening or window 27 on one side and a second ion gauge 28 reversed in position from the first gauge 26 so that its opening is oppositely directed from that of the first gauge. The gauges 26, 28 are separated by a plate 30 inserted through a slot in the body of the device. The gauges 26, 28 are typically of the cold cathode type such as a conventional Philips ion gauge and each includes an anode element 34, 34A spaced between a pair of cathode plates 36, 36A and a magnet member 38, shown as a permanent magnet but not specifically limited thereto, positioned to develop a magnetic field in the order of 370 oersteds between the cathode plates 36, 36A and the anodes 34, 34A respectively. While the magnet member 38 has been illustrated and described as a permanent magnet it should be understood that an electromagnet including the necessary electrical circuitry may be substituted therefor without varying from the scope of the invention. The anodes 34, 34A are maintained at a high positive potential in the order of 2000 volts relative to the grounded cathode plates 36, 36A by a power supply 40, shown in FIG. 3. In operation the anodes 34, 34A attract the free electrons of the residual gas remaining in the system after evacuation. However, because of the large magnetic field surrounding the anodes 34, 34A the electron path length is lengthened by traveling a helical path, therefore, increasing the probability of striking additional gas atoms thereby ionizing them and creating more electrons. The resulting positive ions are attracted toward the cathode plates 36, 36A to produce a current representative of the quantity of the gas atoms or the pressure of the system.

Referring again to FIG. 1, since both of the ion gauges 26, 28 are positioned within the evacuated chamber 12 each will develop a current proportional to the quantity of residual gas atoms remaining in the chamber. However, if the first gauge 26 is positioned to receive not only the residual gas atoms but also the metallic particles 20 originating from the particles source 16 it will produce a current representative of the residual gas atoms and the metallic particles 20 produced by the source 16. Therefore, as long as the second gauge 28 is positioned out of the path of the metallic particles the signal developed from both of the gauges can be supplied to a conventional comparator circuit to develop a signal having a magnitude that varies as a function of the deposition rate of the metallic particles 20 on the substrate 18 and to visually indicate a deposition rate on the precalibrated meter 24.

While in the present embodiment the two ion gauges have been illustrated and described as having an integrated configuration, it should be understood that this is not critical and the two gauges could be separate units as long as they are positioned within the chamber in accordance with the invention.

Referring to FIG. 3 the power supply and comparator unit 22 is generally conventional in nature and includes an electron discharge device illustrated as a dual triode such as a 12AU7 connected as a differential amplifier comparator circuit 39, three power supplies; a high power supply 40, for each of the ion gauges and a lower power supply 42 for the comparator circuit 39, a ganged switch arrangement 50 to calibrate the meter 24 and to select the appropriate range of the high power supply 40 and the milliammeter 24 coupled to the comparator circuit 39 to visually indicate various deposition rates. While five ganged switches have been shown and each includes five contacts, it should be understood that the number of switches and the number of contacts may be varied without varying the scope of the invention. Each of the ganged switches includes a calibration position illustrated as "CAL" in FIG. 3, a pressure indicating position illustrated as "P" and range selection positions illustrated as the numerals 2, 3, and 4. Coupled to each of the range positions is a range potentiometer. The comparator circuit 39 is calibrated in a conventional manner by the placing of the ganged switch 50 in the "CAL" position and the operation of a calibration push button switch 51 and the manipulation of a zeroing potentiometer 52 and a calibration potentiometer 54.

To standardize the ion gauges after evacuation of the chamber, but prior to the deposition process to overcome varying characteristics of the gauges either the ganged operating switch 50 is rotated to any one of range positions 2, 3, or 4 and the corresponding range potentiometer for either gauge is rotated until the milliammeter 24 indicates a zero reading or the magnetic field for the gauges may be varied either by physically repositioning the magnets 38 or by electrical means if an electromagnet is used. In this fashion any idiosyncracies or differences in characteristics of the ion gauges are compensated before the beginning of the deposition process.

Referring to FIG. 4, here is illustrated the relationship of the deposition rate measured in mols per square centimeter per second for lead, gold, chromium, and aluminum. From this graph it is readily apparent that although different metals are evaporated, there are no appreciable changes in the characteristics of the sensing device, thus indicating it is not susceptible to contamination due to the deposition of the metallic particles.

As previously mentioned, the operating switch 50 includes a position marked "P." When the switch is placed in this position, the comparator circuit 39 operates as a conventional pressure gauge because one side of the dual triode is coupled through the switch 50 to ground. Thus, the operating switch provides a calibration position, a plurality of varying range deposition rate positions and a pressure position.

While but one embodiment of this invention has been herein illustrated, it will be appreciated by those skilled in the art that variations in the disclosed arrangement, both as to its details and as to the organization of such details may be made without departing from the spirit and scope hereof. Accordingly it is intended that the foregoing disclosure and the showings made in the drawings shall be considered only as illustrative of the principles of this invention and not construed in a limiting sense.

We claim as our invention:

1. A device for monitoring the rate of vacuum deposition of a metallic film on a substrate positioned within an evacuated chamber containing a metallic particle source comprising:

an integrated sensing device including at one end a first ionization gauge and at the other end a second ionization gauge and intermediate said ends a plate separating said gauges, said first gauge having an opening oriented to admit into said gauge a portion of the residual gas remaining in said chamber and a portion of the particles produced by said metallic particle source and to produce therefrom a first electrical signal representative of the magnitude of said gas and said particles and said second gauge having an opening oriented to admit into said second gauge only a portion of the residual gas remaining in said chamber and to produce therefrom a second electrical signal representative only of the magnitude of said residual gas, and a comparator circuit including a differential amplifier circuit coupled with said ionization gauges to receive said first and second electrical signals and to produce a third electrical signal representative of the difference of the magnitudes of said first and second electrical signals, said circut including an indicating means coupled to receive said third signal, said indicating means being calibrated to visually indicate as a function of the magnitude of said third signal the rate of deposition of a metallic film on said substrate.

2. A device for monitoring the rate of vacuum deposition of a metallic film on a substrate positioned within an evacuated chamber containing a metallic particle source comprising:

an elongated sensing device including a tubular member formed at one end into a first cold cathode ionization gauge and at the other end into a second cold cathode ionization gauge and intermediate said ends a plate supported transversely by said tubular member to separate said gauges, said gauges each having a hollow cathode element defined by the walls of said tubular member, an anode element extending into said hollow cathode element and a source of magnetic power positioned to develop a magnetic field around said anode and cathode elements, said first gauge having an opening in its cathode element oriented to admit therein the residual gas remaining in said chamber and the particles produced by said metallic particle source to produce a first electrical signal representative of the magnitude of said gas and said particles and said second gauge having an opening in its cathode element oriented to admit therein only the residual gas remaining in said chamber to produce a second electrical signal representative only of the magnitude of said residual gas, and a comparator circuit including a differential amplifier circuit coupled with said ionization gauges to receive said electrical signals to produce a third electrical signal representative of the difference of the magnitudes of said first and second electrical signals, said circuit including a microammeter coupled to receive said third signal and calibrated to visually indicate as a function of the magnitude of said third signal the rate of deposition of a metallic film on said substrate.

References Cited by the Examiner

UNITED STATES PATENTS 2,761,976   9/1956   Obermaier et al.
2,954,474   9/1960   Lawrance.

OTHER REFERENCES

Giedd, G. R. and Perkins, M. H.: "Evaporation Rate Monitor" IBM Technical Disclosure Bulletin: vol. 4, No. 9, February 1962; pp. 13 and 14.

WALTER L. CARLSON, *Primary Examiner.*

FREDERICK M. STRADER, *Examiner.*

C. F. ROBERTS, *Assistant Examiner.*